(12) United States Patent
Weller et al.

(10) Patent No.: US 7,676,673 B2
(45) Date of Patent: Mar. 9, 2010

(54) MULTI-LEVEL SECURE (MLS) INFORMATION NETWORK

(75) Inventors: Michael K. Weller, Stroudsburg, PA (US); Tarachrand A. Mangra, Bloomingdale, NJ (US); Joseph A. Litzinger, Landing, NJ (US); Sanket J. Shah, Old Bridge, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 985 days.

(21) Appl. No.: 11/414,105

(22) Filed: Apr. 28, 2006

(65) Prior Publication Data

US 2007/0255942 A1    Nov. 1, 2007

(51) Int. Cl.
*H04L 29/06* (2006.01)
(52) U.S. Cl. ............... 713/164; 713/166; 726/21
(58) Field of Classification Search .......... 713/151, 713/154, 164, 166; 726/21, 22
See application file for complete search history.

(56) References Cited

U.S. PATENT DOCUMENTS

| | | | |
|---|---|---|---|
| 5,802,178 | A | 9/1998 | Holden et al. |
| 5,828,832 | A | 10/1998 | Holden et al. |
| 5,832,228 | A | 11/1998 | Holden et al. |
| 5,864,683 | A * | 1/1999 | Boebert et al. .......... 709/249 |
| 5,872,847 | A * | 2/1999 | Boyle et al. .............. 713/151 |
| 6,067,620 | A | 5/2000 | Holden et al. |
| 6,272,538 | B1 | 8/2001 | Holden et al. |
| 6,760,768 | B2 | 7/2004 | Holden et al. |
| 7,559,080 | B2 * | 7/2009 | Bhargavan et al. ........... 726/1 |
| 2004/0225883 | A1 | 11/2004 | Weller et al. |
| 2007/0204151 | A1 * | 8/2007 | Schnackenberg et al. .... 713/161 |
| 2007/0255942 | A1 | 11/2007 | Weller et al. |
| 2008/0098143 | A1 | 4/2008 | Canter et al. |

OTHER PUBLICATIONS

W.S. Harrison, et al, "The MILS Architecture for a Secure Global Information Grid", J. Defense Software Eng. (Oct. 2005), at 20-24.
W.M. Vanfleet, et al, "Deeply Embedded High Assurance Multiple Independent Levels of Security" (slide presentation Sep. 9, 2002).

(Continued)

*Primary Examiner*—Gilberto Barron, Jr.
*Assistant Examiner*—Virginia Ho
(74) *Attorney, Agent, or Firm*—Leo Zucker

(57) ABSTRACT

A method of enforcing a network security policy including mandatory access control (MAC), discretionary access control (DAC) and integrity control for a secure information network, includes operating a transport guard within a memory partition logically between a protected application running in the partition and a networking stack, and defining ports for the transport guard including (i) an application port for forwarding data to and receiving data from the application, (ii) a data port for receiving data addressed to the application from the networking stack, and for sending data originating from the application to the stack, and (iii) a control port for supplying configuration data to the transport guard. The configuration data corresponds to MAC, DAC and integrity control policies specified by the network for the protected application. The transport guard limits data flow between its protected application and the data ports accordingly.

16 Claims, 7 Drawing Sheets

OTHER PUBLICATIONS

Bill Beckwith, "MILS Middleware: Status Update", Objective Interface Systems, Inc. (slide presentation Jan. 2004).

C. Adams, "Keeping Secrets in Integrated Avionics", Avionics Magazine (Mar. 2004).

J. Alves-Foss, et al., "A Multilayered Approach to Security in High Assurance Systems", U. of Idaho (undated).

T.E. Levin, et al, "A Least Privilege Model for Static Separation Kernels", Naval Postgraduate School, Tech. Rept. NPS-CS-05-003 (Oct. 2004).

* cited by examiner

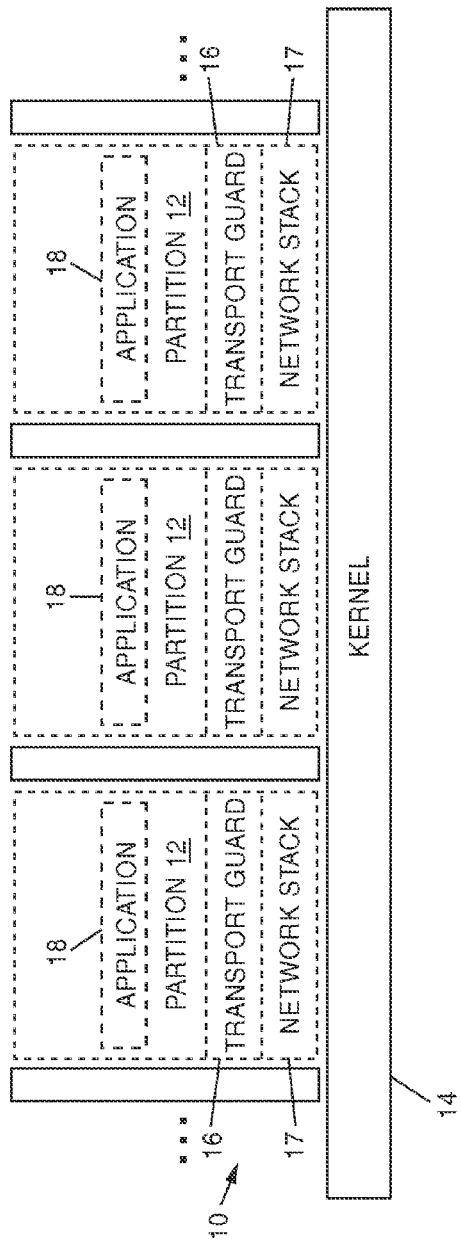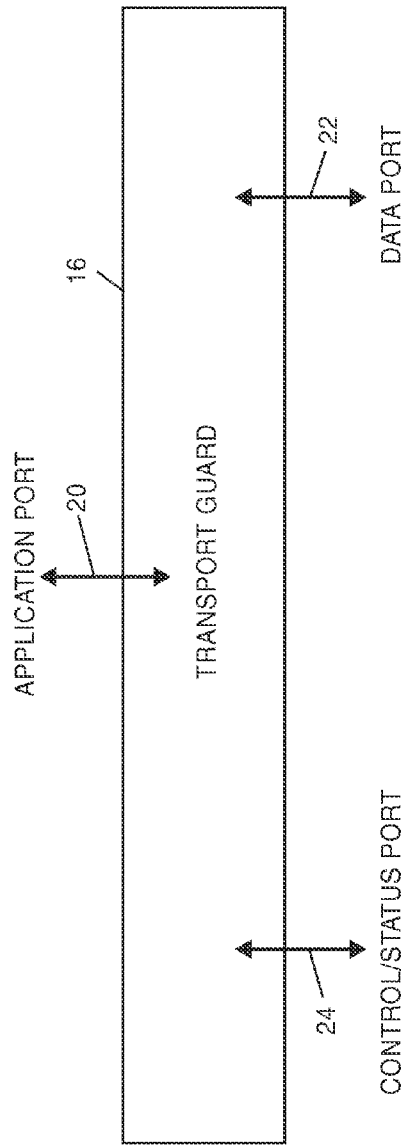

MULTI-LEVEL SECURE (MLS) INFORMATION NETWORK

BACKGROUND OF THE INVENTION

1. Field of the Invention

This invention concerns a network architecture that enforces desired security policies with respect to the flow of information on secure networks.

2. Discussion of the Known Art

Information networks for use by the government and the military typically carry sensitive information that must be confined among individuals who have proper security clearances and a need to know. Multi-level security (MLS) concerns the ability of a network or computer system to handle messages that are classified as, for example, top secret (TS), secret (S) or confidential (C), as well as unclassified (U) messages. A MLS network typically allows higher-cleared individuals to access less-sensitive information.

U.S. Patent Application Publication No. 2004/0225883 (Nov. 11, 2004) concerns a method of providing multiple single levels of security (MSLS) in a communication system. The publication discloses an arrangement for enforcing system access policies by way of controlling hardware. Currently, solutions for providing embedded security in communication networks by way of software (as opposed to hardware) allow for greater flexibility.

A network architecture known as Multiple Independent Levels of Security (MILS) has been created to facilitate the development of MLS networks that can be certified as meeting the highest current standards, namely, Evaluation Assurance Levels (EALs) 5-7. See W. S. Harrison, et al., "The MILS Architecture for a Secure Global Information Grid", Journal of Defense Software Engineering (October 2005) at pages 20-24, which is incorporated by reference. MILS architecture partitions security enforcement into three layers, viz., the kernel, middleware, and application. As used herein, middleware refers to software that provides interoperability between an operating system and an application on a network. Examples include the known common object reference broker architecture (CORBA), and file systems.

The MILS architecture provides a structured approach to data separation and information flow control. The architecture facilitates proof in correctness of design of security mechanisms at various levels, by partitioning security enforcement into the three mentioned layers. See W. M. Vanfleet, et al., "Deeply Embedded High Assurance Multiple Independent Levels of Security, Real Time OS and Middleware Architecture" (slide presentation; Sep. 9, 2002).

The basic component of MILS architecture is the separation kernel (SK) which serves to separate processes or applications on a processor, and their resources, into isolated spaces sometimes known as partitions or process spaces. The separation kernel enforces data isolation and information flow control on each node. As used herein, "node" refers to a single hardware processor. The SK uses the processor's memory management unit to provide the process separation. The SK also uses inter-process communication (IPC) mechanisms such as shared memory or messaging, to provide information flow control on any given node (but not between partitions on separate processors). On a single processor system, little or no middleware is required to provide security enforcement.

For a network with more than one processor node, more complex middleware is required to enforce a data isolation and information flow control policy for the network. One particular approach to the multi-node middleware problem was disclosed by Bill Beckwith, "MILS Middleware: Status Update", Objective Interface Systems, Inc., Open Group Meeting, Security for Real-Time (slide presentation) (January 2004), discussing requirements for a partitioned communication system (PCS) designed for EAL 7 certification. The PCS approach relies on the kernel to enforce a network's information flow policies by way of a MILS message routing (MMR) component. The main function of the MMR is to open a communication path between applications in different partitions, but only if such communication is permitted by the flow policies of the network. The PCS approach is aimed at controlling network message routing at the CORBA level only. A PCS also requires encryption services to provide middleware protection between processors, and the kernel is relied upon to provide the middleware access control functionality.

Network security information flow control policies may include any of the following; viz., discretionary access control (DAC), mandatory access control (MAC), and integrity access control. Network security models typically use the terms "subjects" and "objects". Subjects are defined as active agents in a computer system, for example, live users, processes, and other computers. Objects refer to containers of data which can be acted upon by the subjects. Examples of objects include databases, file systems, and memory locations.

DAC defines certain access control policies for objects (e.g., files or databases), which policies may be set at the discretion of the object owner. The controls are discretionary in that the owner may permit access to the object directly or indirectly by other specified subjects. These access permissions are generally applied to users, but may be extended to apply to any subject in the network or system.

By contrast, MAC provides label-based access control according to hierarchical and non-hierarchical characteristics of both the subject and the object. If the label of a given subject dominates the object (e.g., is of a higher classification), then information originating from the object may flow to the subject. This is referred to as the Bell and La Padula security model, which permits "read down" and "write up" requests, while blocking requests to "read up" and "write down". The model requires that (1) a subject at a given security level may only read data from objects at the same or a lower security level, and (2) a subject at a given security level may only write data to objects having the same or a higher security level.

Integrity concerns a level of confidence or trust that may be placed in a subject or an object (e.g., an application) on the network. For example, the higher the level of integrity for a given application, the more confidence a subject may have that the application will execute properly. Likewise, data having a higher integrity level is known to be more accurate (i.e., reliable) than data of a lower integrity level. Network integrity may be defined, for example, by way of the so-called BIBA integrity model which permits information to flow from a higher integrity process to a lower integrity process, and, like MAC, may also be label-based.

SUMMARY OF THE INVENTION

According to the invention, a method of enforcing a network security policy including mandatory access control (MAC), discretionary access control (DAC) and integrity control for a network or system that features multi-level security (MLS) and relies on a kernel for defining memory partitions each of which is arranged to support a protected application, includes operating a transport guard within a given partition logically between the protected application and a networking stack of the network, and defining a number of ports for the transport guard. The ports include an application port for forwarding data to and receiving data from the protected application, a data port for receiving data addressed to the application from the networking stack and for sending data originating from the application to the networking stack, and a control port for supplying configuration data to the transport guard. The configuration data corresponds to the MAC, the DAC and the integrity level specified by the network security policy for the application.

The method also includes first determining, according to the configuration data, if first data received at the data port originates from a subject or user that is allowed access to the protected application according to the network security policy, and forwarding the first data to the application port only after a positive determination; and second determining, according to the configuration data, if second data received at the application port is destined to a subject or user allowed access to the application according to the security policy, and forwarding the second data to the data port only after a positive determination.

For a better understanding of the invention, reference is made to the following description taken in conjunction with the accompanying drawing and the appended claims.

BRIEF DESCRIPTION OF THE DRAWING

In the drawing:

FIG. 1 is a block diagram showing a number of transport guards placed logically inside corresponding memory partitions of a secure network, according to the invention;

FIG. 2 is a block diagram showing ports of a transport guard in FIG. 1;

DETAILED DESCRIPTION OF THE INVENTION

Figure 3:
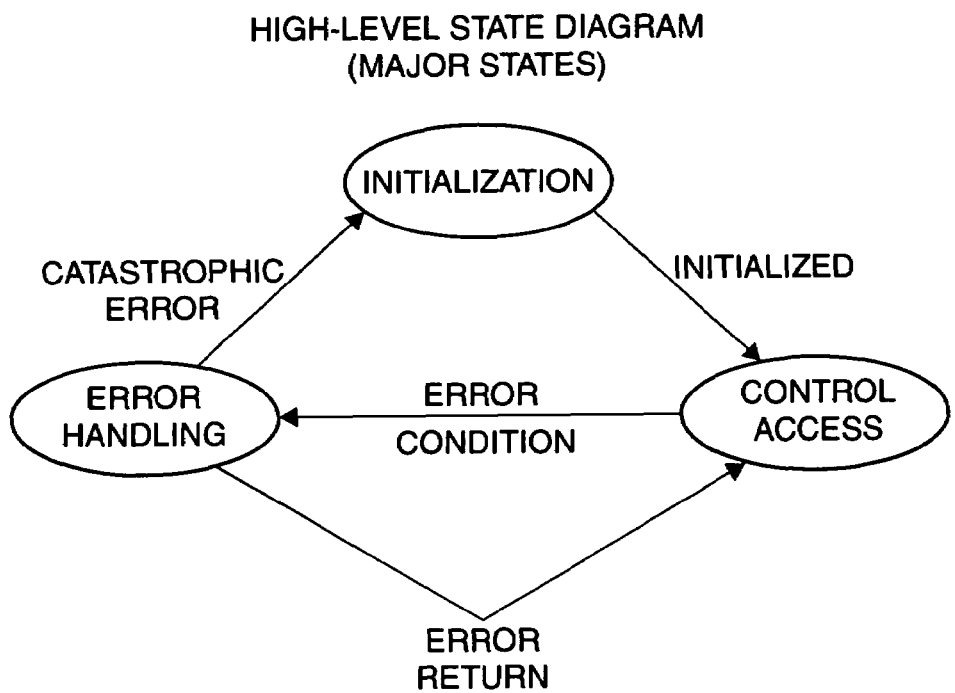
FIG. 3 is a high-level state diagram for the transport guard.

FIG. 1 shows a portion of a multi-level secure network 10, including a number of separate memory partitions 12 that are established by a separation kernel 14 of the network's operating system. A transport guard 16 according to the invention is created logically between a networking stack 17 and an application 18 assigned to operate on its own processor within a corresponding partition 12, under protection of the guard 16. As seen in FIG. 2, each transport guard 16 receives requests from the assigned application 18 via an application port 20 to send outgoing data destined to, e.g., another application, a user, or some other object on the network. If the guard 16 determines that the data conforms to the network security policy, as explained below, the outgoing data is forwarded to the kernel 14 through a data port 22 and into the networking stack 17 using, e.g., a kernel IPC mechanism.

Each transport guard 16 also receives incoming data at the port 22 from the networking stack, which data is destined to the protected application 18. If the data conforms to the network security policy, the guard 16 sends the incoming data to the application through the application port 20. Moreover, each guard 16 receives configuration data from a network security manager through a control/status port 24. Auditable events such as, e.g., the presence of non-conforming data at the application port 20 or the data port 22, are reported by the guard 16 to the security manager through the control/status port 24. The guards 16 may be implemented in software code, running in their own process space inside their associated partitions 12.

Each transport guard 16 provides mandatory and discretionary access control, and integrity access control over all information and other data flowing into and out of the networking stack 17 with respect to the guard's protected application 18. The guards 16 allow only authorized traffic to enter and exit each partition 12 by monitoring and selectively labeling both incoming and outgoing data or traffic. Further, the guards may be implemented at any layer of the conventional OSI network model, for example, the CORBA level immediately under the ORB. Each transport guard 16 may be viewed as implementing the goals of a reference monitor in that the guard's functions are non-bypassable, evaluatable (to determine usefulness and/or effectiveness of a given rule), always invoked, and tamper-proof.

Figure 4:
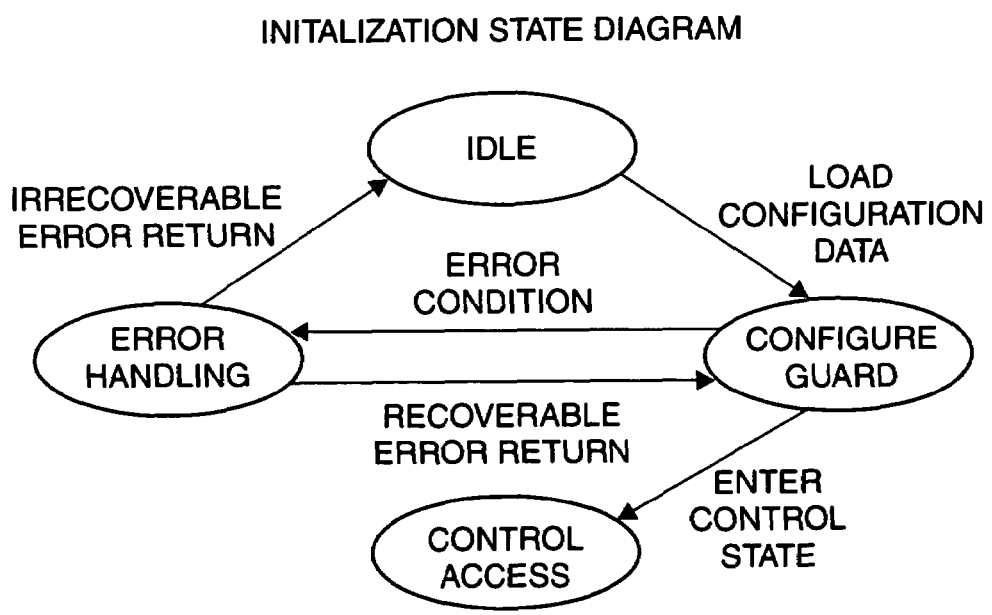
FIG. 4 is a state diagram showing initialization of the transport guard.

FIG. 3 shows three high-level or major states of each of the transport guards 16, namely; initialization, control access, and error handling. The initialization state is illustrated in FIG. 4 wherein each guard is activated and idles with its application port 20 and data port 22 inhibited. Each guard is then configured by the network security manager via the guard's control/status port 24. Once configured, the guards 16 enter a control access state (FIG. 5) in which they operate to monitor and control the flow of data to and from their protected applications 18.

Figure 5:
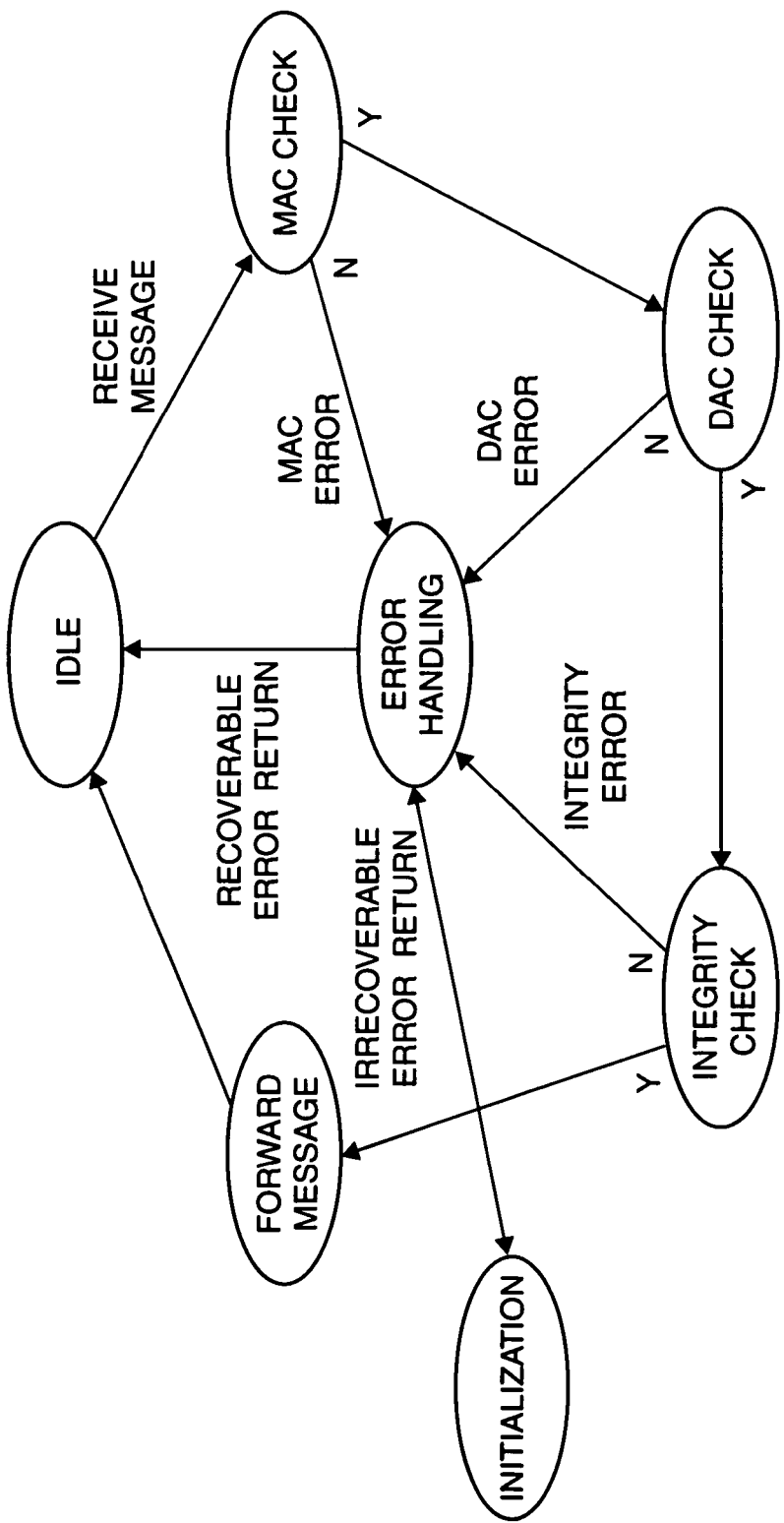
FIG. 5 is a state diagram showing control functions of the transport guard.

Upon receiving valid initialization vectors from the security manager, each transport guard 16 transitions to the control access state shown in FIG. 5. Header labels of message data packets received on the data port 22 from the networking stack 17 are checked against the mandatory access control (MAC), discretionary access control (DAC), and integrity policies of the network 10 according to the configuration data supplied to the guard for the protected application 18. For example, a guard 16 may implement the mentioned Bell-La Padula MAC security model, and be configured to handle messages with single hierarchical classification fields and up to N non-hierarchical classification fields. Discretionary access control by a given guard 16 may be implemented by way of an access control list (see FIG. 9) that identifies the addresses of all other transport guards with which the given guard may communicate, including directional control (receive only, transmit only, or both). Further, the guard 16 may be configured to implement the mentioned BIBA integrity model.

Once a given transport guard 16 determines that incoming message data is acceptable, it forwards the data to the application port 20 for use by the protected application 18. Two configurations of the transport guard 16 may be implemented, namely; one that protects an untrusted application and one that protects a trusted application. A state diagram for a guard configured to protect untrusted applications is shown in FIG. 6, and a state diagram for a guard configured to protect trusted applications is shown in FIG. 7.

Figure 6:
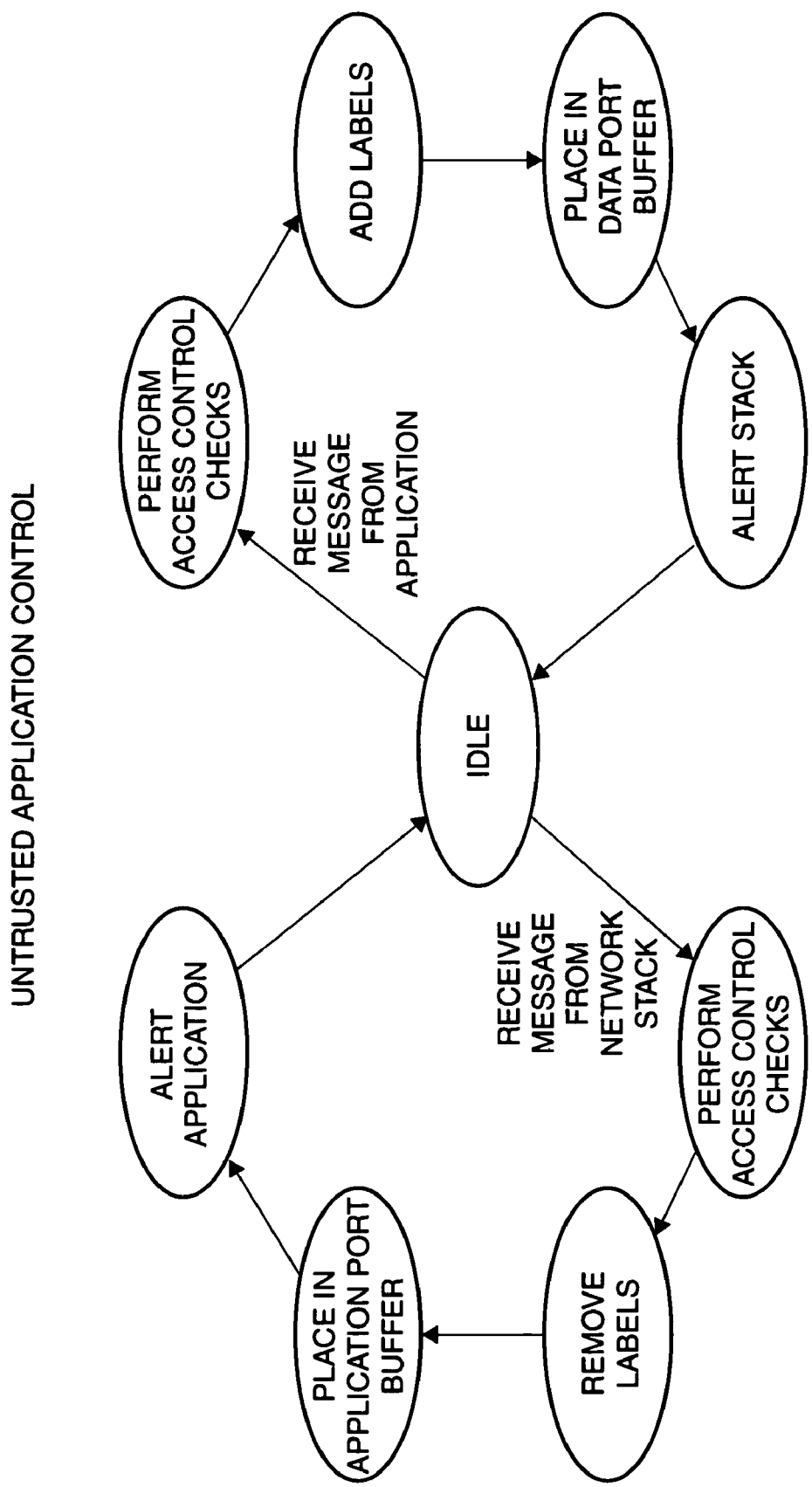
FIG. 6 is a state diagram illustrating operation of the transport guard for untrusted applications.

As shown at the left in FIG. 6, a transport guard that protects an untrusted application is configured so that after performing access control and integrity checks on incoming message data from the networking stack, security labels are stripped or removed from the data prior to placing the data in a buffer for the application port 20, and alerting the application to retrieve the buffered data. Likewise, as seen at the right of the figure, the guard is configured so that after performing access control and integrity checks on outgoing data from the application, the guard adds the appropriate security labels to the data before placing it in a buffer and alerting the networking stack to accept the data for flow into the kernel 14.

For an untrusted application, high and low values of the range for the classification and the integrity levels are preferably set equal in the configuration data for the associated guard 16. Access control lists are provided to the guard to identify those system objects with which the guard may allow communication, with associated information flow control (send and/or receive). The access control lists also identify the associated MAC labels (range) and integrity labels (range) associated with those objects allowed to communicate with the guard's protected application.

Figure 7:
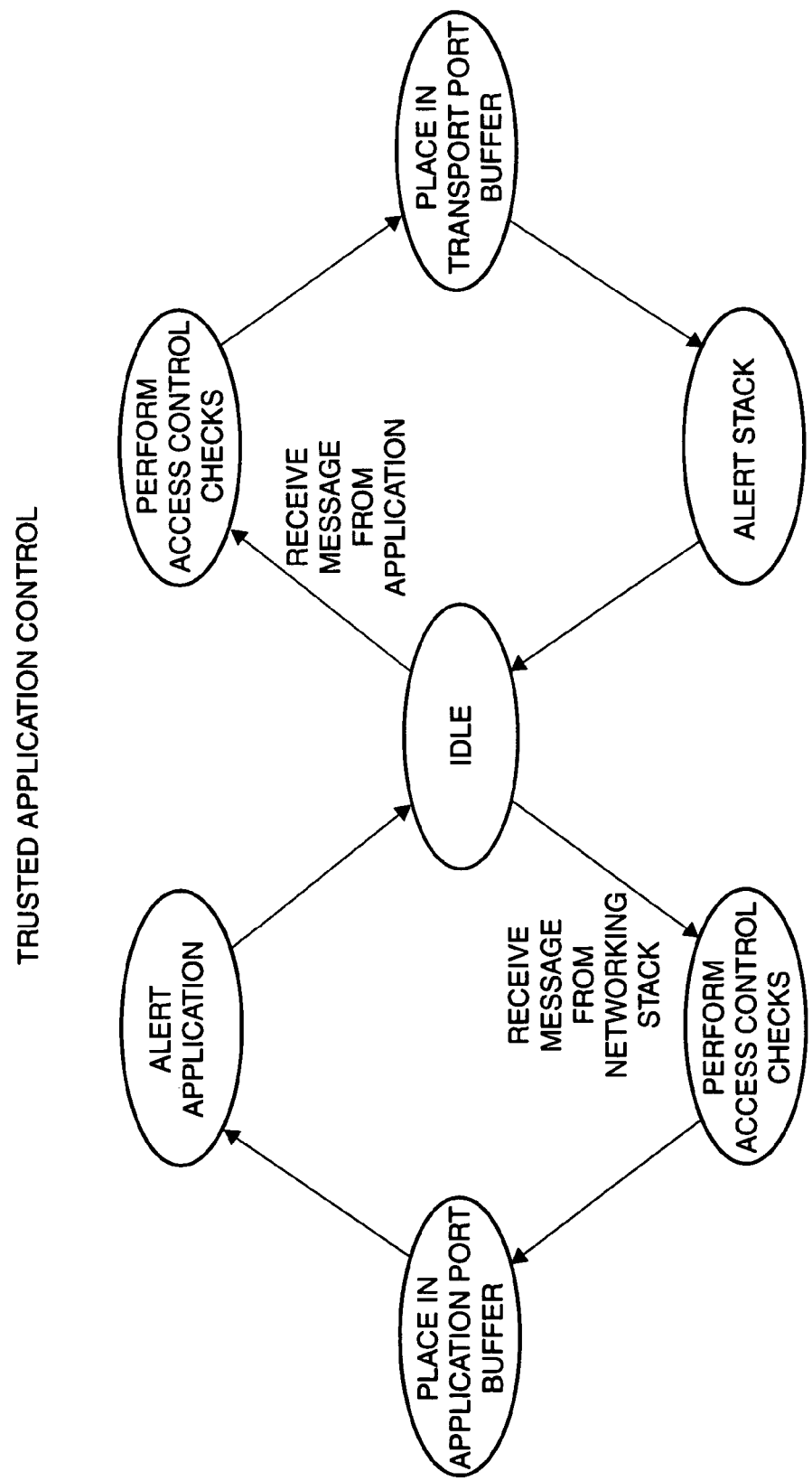
FIG. 7 is a state diagram illustrating operation of the transport guard for trusted applications.

As seen at the left in FIG. 7, a transport guard that protects a trusted application is configured so that after performing access control and integrity checks on incoming message data from the networking stack 17, the data is placed directly in the buffer for the application port 20, leaving in tact any MAC and integrity security labels in the incoming data packets. That is, the guard retains the incoming security header labels when making data available at the application port 20. Trusted applications that support multiple security and integrity levels need to retain the access control and the integrity labels on the incoming message data, so that the application can manage information within the data properly.

As shown at the right in FIG. 7, a guard that protects a trusted application is also configured so that after performing the access control and integrity checks on outgoing message data from the application, security labels applied to the data packets by the application are left in tact, and the data is placed directly in a buffer to flow into the networking stack 17. Configuration data for a transport guard that protects a trusted application includes, for example, an access control list, ranges of integrity levels and classification levels that are supported by the application, as well as security labels of applications that are permitted to communicate with the protected application.

In all cases, if an auditable event occurs, the transport guard which detected the event is preferably configured to report the event to the network security manager via the guard's control/status port 24.

Figures 8, 9:
FIG. 8 shows a security header for data packets to be managed by the transport guard.
FIG. 9 shows an access control table the transport guard.

FIG. 8 is an example of a security header 90 that may be appended to data packets managed by the transport guards 16. In a preferred embodiment, the transport guards 16 encapsulate high level (e.g., application) data similar to a known mechanism by which IP encapsulates a TCP message, by pre-pending the security header of FIG. 8 to a TCP message having its own header and data. A source field 92 contains a designated address for the specific transport guard from which a given data packet originates, i.e., the guard that sources the packet; and a destination field 94 contains a designated address for the transport guard to which the data packet is destined, i.e., the guard that sinks the packet. Both the source and the destination fields 92, 94 may have a length of, e.g., 32-bits each.

A classification field 96 in the header 90 represents a classification or hierarchical level for the given packet. The classification field 96 may be, e.g., 8-bits long with a 0 (binary 00) representing Unclassified, a 1 (binary 01) representing Confidential, a 2 (binary 10) representing Secret, and a 3 (binary 11) representing Top Secret. All other values may remain unused. The next three fields 98, 100, 102 represent non-hierarchical labels (Compartments) for mandatory access control (MAC) to be associated with the data packet. Up to three labels are supported in the illustrative embodiment.

As mentioned, MAC enforces a network's security policy based upon both hierarchical and non-hierarchical data. For example, a hierarchical portion of the header 90 is the classification field 96 which contains a classification level or security clearance. The non-hierarchical fields 98, 100, and 102 place additional restrictions on an associated data packet, unrelated to the clearance of the user or classification of the data (e.g., US only). A non-governmental example may include the position of a user within a company (e.g., vice-president) for the hierarchical field 96 of the header 90, and a department within the company (e.g., finance) for one of the non-hierarchical fields 98, 100 and 102. Each of the fields 98, 100, 102 may also be, e.g., 8-bits in length.

The last field 104 represents an integrity level for the data packet. The field 104 is, e.g., 8-bits long, with a 0 (binary 00) corresponding to low integrity, a 1 (binary 01) representing medium integrity, and a 2 (binary 10) corresponding to high integrity. All other values may remain unused.

FIG. 9 is an illustrative representation of an access control table 120 for each of a number of system transport guards 16, according to the invention.

Fields in a first row 122 of the table 120 represent certain values for the local transport guard, i.e., the guard 16 in which the table is 120 is configured. The first row 122 has fields that contain (i) the local guard's address, (ii) the lowest classification level supported by the guard, (iii) the highest classification level supported by the guard, (iv) up to three non-hierarchical labels, and (v) an integrity label. Items (ii) and (iii) may therefore implement the mentioned Bell La Padula security model. The table 120 also has "Receive" and "Transmit" fields, in which no entries are provided in the first row 122 for the local guard.

A second row 124 and subsequent rows contain the above information for other transport guards with which the local transport guard is allowed to communicate under the applicable discretionary access control (DAC) network security policy. Row 124 and the following rows each contain an address of the corresponding guard, the lowest classification level supported by the guard, the highest classification level supported, up to three non-hierarchical labels, and an integrity label for the guard. The DAC policy is further implemented by the Receive and the Transmit fields in the rows for the other guards wherein, for example, a "1" in both fields means the local transport guard is allowed to receive data from and to transmit data to the corresponding other guard.

EXAMPLE

Figure 10:
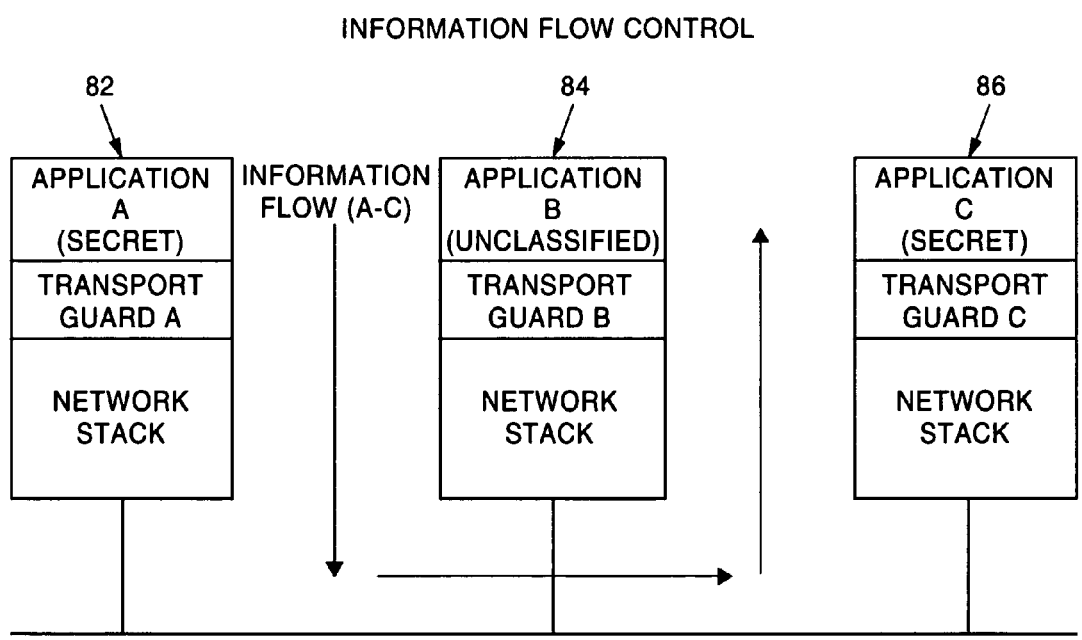
FIG. 10 is a block diagram depicting information flow through a secure network in which a number of the inventive transport guards are embedded.

FIG. 10 illustrates an example of information flow control provided by three transport guards according to the invention, the guards being designated in the figure by the letters A, B and C. The guards reside within corresponding partitions 82, 84 and 86, between a networking stack and an associated application that resides on its own processor within the corresponding partition. The example assumes that:

1. The access control tables 120 for the transport guards A, B, and C are configured (via a DAC entry) to support information flow between application A and application C;

2. Transport guards A and C have their tables 120 configured to support untrusted applications at a Secret classification;

3. Transport guard B has its table 120 configured to support an untrusted application at an Unclassified classification; and 4. The tables 120 for all transport guards are configured to support applications having "low" integrity (integrity label).

When application A attempts to send a data packet to application C, the packet first must flow through guard A. Upon examination of destination information in the packet, local transport guard A will confirm from its access control table 120 that (i) the label (Secret) associated with the transport guard for application C is identical to that for application A, (ii) the destination (transport guard for application C) is listed as an object to which the guard A is permitted to send data packets, and (iii) the integrity label (low) associated with destination, is identical to the integrity label for Application A.

Once all the above checks are successfully completed, transport guard A forwards the data packet to the networking stack in partition 82 for delivery over the network 10 to transport guard C in partition 86. Transport guard C then makes all the necessary security checks to determine if the arriving packet is one that may be received by application C. Upon successfully completing the access checks, transport guard C forwards the data packet to application C.

In the event application A in partition 82 attempts to send a data packet to application B in partition 84, transport guard A first makes the required access control checks. Because a MAC check will fail (i.e., SECRET is greater than UNCLASSIFIED), transport guard A will drop the packet and report an auditable event to the network security manager or service. If the MAC check inadvertently overlooks the inequality of the security classifications, a DAC check by transport guard A will determine that application A is not permitted to send data to application B, and the packet will be dropped.

The inventive transport guards offer security policy enforcement within the networking stacks of local partitions and also provide inter-partition security services, without having to rely on encryption. The guards enforce mandatory access control, discretionary access control, integrity, and information flow. Moreover, the guards 16 may be implemented between any two layers of the networking stack above the media access control (e.g., Ethernet) layer of the OSI network reference model, for example and without limitation, between CORBA and TCP, or between Ethernet and IP. Networks having commercial off the shelf (COTS) transport technologies such as CORBA, TCP, and IP may therefore retain such features even after the inventive guards 16 are embedded in the networks.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of enforcing a network security policy including mandatory access control (MAC), discretionary access control (DAC) and integrity control for an information network that features multi-level security (MLS) and relies on a kernel that defines memory partitions, the method comprising:

operating a transport guard within a given partition logically between a protected application running within the partition, and a networking stack of the network;

providing a network security manager for supplying configuration data corresponding to the network security policy for the protected application running in each partition in which a transport guard is operating;

defining ports for each transport guard including (i) an application port for forwarding data to and receiving data from the protected application running in the partition in which the transport guard is operating, (ii) a data port for receiving data addressed to the protected application from the networking stack, and for sending data originating from the protected application to the networking stack, and (iii) a control port for receiving configuration data supplied by the network security manager, wherein the configuration data corresponds to the MAC, the DAC and the integrity control specified by the network security policy for the protected application;

configuring each transport guard during an initialization state according to the configuration data supplied to the guard from the network security manager;

first determining, during a control access state following the initialization state, if first data received at the data port of each transport guard originates from a subject or user that is allowed access to the protected application running in the partition in which the transport guard is operating according to the configuration data supplied to the transport guard during the initialization state, and forwarding the first data for delivery to the application port only after a positive determination; and second determining, during the control access state, if second data received at the application port of each transport guard is destined to a subject or user that is allowed access to the protected application according to the configuration data supplied to the transport guard during the initialization state, and forwarding the second data for delivery to the data port only after a positive determination.

2. The method of claim 1, including reporting an auditable event through the control port of each transport guard in the absence of a positive determination after the guard performs the first determining step.

3. The method of claim 1, including reporting an auditable event through the control port of each transport guard in the absence of a positive determination after the guard performs the second determining step.

4. The method of claim 1, including, at each transport guard, removing security labels from the first data before forwarding the data for delivery to the application port if the protected application running in the partition in which the guard is operating is an untrusted application.

5. The method of claim 1, including, at each transport guard, adding security labels to the second data before forwarding the data for delivery to the data port if the protected application running in the partition in which the guard is operating is an untrusted application.

6. The method of claim 1, including embedding each transport guard between CORBA and TCP layers of the network.

7. The method of claim 1, including embedding each transport guard between Ethernet and IP layers of the network.

8. The method of claim 1, including, at each transport guard, sending data originating from the protected application running in the partition in which the guard is operating into the networking stack using a kernel inter-process communication (IPC) mechanism.

9. The method of claim 1, including appending a security header to data to be managed by each transport guard, and defining fields for the header including a source field for identifying a transport guard from which the data originates, a destination field for identifying a transport guard to which the data is destined, and one or more security fields for containing information corresponding to the mandatory access control (MAC) policy of the network.

10. The method of claim 9, including providing information corresponding to an integrity level for the data in one of the security fields.

11. The method of claim 9, including providing information corresponding to a security classification level for the data in one of the security fields.

12. The method of claim 1, including defining an access control table for a given transport guard, and identifying in the table other transport guards with which the given transport guard may communicate according to the discretionary access control (DAC) policy of the network.

13. The method of claim 12, including providing information in the access control table corresponding to ranges of security classifications associated with each of the other transport guards.

14. The method of claim 12, including providing information in the access control corresponding to integrity levels associated with each of the other transport guards.

15. The method of claim 12, including providing information in the access control table for indicating whether or not the given transport guard may transmit data to each of the other transport guards.

16. The method of claim 12, including providing information in the access control table for indicating whether or not the given transport guard may receive data from each of the other transport guards.

* * * * *